US012622343B2

(12) United States Patent
Crucianelli

(10) Patent No.: US 12,622,343 B2
(45) Date of Patent: May 12, 2026

(54) AGRICULTURAL TOOL UNIT FOR RAPID CONVERSION OF A COMBINATION SEED DRILL HAVING A TRAILED OR FINE-GRAIN SEED DISPENSER TO AN ON-DEMAND SUPPLY SYSTEM AND VICE VERSA

(71) Applicant: TALLERES METALURGICOS CRUCIANELLI S.A., Armstrong (AR)

(72) Inventor: Gustavo Raul Crucianelli, Armstrong (AR)

(73) Assignee: TALLERES METALURGICOS CRUCIANELLI S.A., Armstrong (AR)

( * ) Notice: Subject to any disclaimer, the term of this patent is extended or adjusted under 35 U.S.C. 154(b) by 1076 days.

(21) Appl. No.: 17/616,879

(22) PCT Filed: Jun. 6, 2019

(86) PCT No.: PCT/IB2019/054738
§ 371 (c)(1),
(2) Date: Dec. 6, 2021

(87) PCT Pub. No.: WO2020/245637
PCT Pub. Date: Dec. 10, 2020

(65) Prior Publication Data
US 2022/0312665 A1     Oct. 6, 2022

(51) Int. Cl.
*A01C 7/08*          (2006.01)
*A01C 7/12*          (2006.01)
*A01C 15/00*         (2006.01)
(52) U.S. Cl.
CPC .............. *A01C 7/081* (2013.01); *A01C 7/123* (2013.01); *A01C 15/006* (2013.01)

(58) Field of Classification Search
None
See application file for complete search history.

(56) References Cited

U.S. PATENT DOCUMENTS 4,306,509  A     12/1981  Hassan et al.
4,514,114  A  *   4/1985  Fuss ...................... A01C 7/125
                                                        406/146
(Continued)

FOREIGN PATENT DOCUMENTS

CN         206977950  U     2/2018
FR           2591416  A1  *  6/1987

OTHER PUBLICATIONS

FR2591416A1, Machine Translation, FIT Database (retrieved Feb. 10, 2025) (Year: 1987).*
(Continued)

*Primary Examiner* — William R Harp
(74) *Attorney, Agent, or Firm* — LUCAS & MERCANTI, LLP

(57)          ABSTRACT

Agricultural implement assembly, for the rapid transformation of a seed drill with a drilling or dragging dosing device, volumetric supplier to an on-demand supplier and vice versa, including at least one hopper containing a granular input, such as grains, seeds or granules of agrochemicals, and a delivery device arranged under the hopper. This device has a structure consisting of two physically delimited areas. A seed box is formed by side walls that delimit its width, a bottom wall, a rear wall with the air inlet from the fan, and a front partition that has at least the passage of the seed to the area where the dragging rotor is eventually located for the case of drilling work, or to the area where the containment slope is located for the case of on-demand supply.

9 Claims, 19 Drawing Sheets

(56)     References Cited

U.S. PATENT DOCUMENTS

| 4,705,220 | A  * | 11/1987 | Gandrud | ............... | A01C 7/123 |
| | | | | | 239/654 |
| 5,947,040 | A | 9/1999 | Gregor | | |
| 8,448,585 | B2 * | 5/2013 | Wilhelmi | .............. | A01C 7/084 |
| | | | | | 111/175 |
| 11,730,080 | B2 * | 8/2023 | Crucianelli | ......... | A01C 15/006 |
| | | | | | 406/138 |
| 2017/0273235 | A1 | 9/2017 | Kordick | | |
| 2018/0098485 | A1 | 4/2018 | Beaujot et al. | | |

OTHER PUBLICATIONS

International Search Report for PCT/IB2019/054738 dated Jan. 27, 2020 and English translation.

* cited by examiner

AGRICULTURAL TOOL UNIT FOR RAPID CONVERSION OF A COMBINATION SEED DRILL HAVING A TRAILED OR FINE-GRAIN SEED DISPENSER TO AN ON-DEMAND SUPPLY SYSTEM AND VICE VERSA

CROSS REFERENCE TO RELATED APPLICATION

This Application is a 371 of PCT/IB2019/054738 filed on Jun. 6, 2019, which is incorporated herein by reference.

FIELD OF APPLICATION OF THE PRESENT INVENTION

The present invention refers to the field of transporting granulated solid materials via an air current, from a container or hopper to the means of implantation of said materials. One of the most common applications of these systems refers to agricultural machinery when it is used to transport these granulated solid materials, such as seeds or granular fertilizer, from a hopper or reservoir, ideally a centralized reservoir, to the precision dosing equipment called "single grain" located on the planting unit (Planters) and in equipment that performs seeding of fine seeds and/or solid fertilizers by volumetric dosing means also called "drilling" (Seeders).

The application field of the present invention provides means for allowing, in a seed drill from a machine having a dragging or volumetric delivery system, provided by any mechanical element of granular material dragging, to quickly, simply, without the use of special tools in the same field or lot where the seed drill operates, transform it into a seed drill with an on-demand delivery device. The application field of the present invention more specifically provides means for allowing, the rapid conversion of an on-demand seeder into a seed drill, without having to displace the seed drill machine to a certain site, such as a (mechanical) workshop, and without the need for any special tool, nor needing the assistance of specialized personnel.

Meaning of the Terms Used in the Present Invention

The main HOPPER is understood to be the large volume container, usually installed on the central portion of the seed drill or coupled in some way to the seed drill independently and containing in bulk the seed, or input to be deposited on the ground. Usually and in a known form, the seed drills have more than one such centrally located hopper.

DELIVERY DEVICE: It is composed of an AIR BOX and at least part of the SEED BOX. This device is usually located under the hopper. The air box is basically formed by a hollow body in the form of a tunnel, with an air inlet at its rear end, air current that at its opposite end proceeds to drive the granulated material by sending it towards the deposition means to the ground. The seed box is in communication with the bottom of the hopper and receives the granulated material from said hopper, for shipment thereof to the SEED INJECTION CHAMBER.

For the purposes of the invention, any device capable of delivering certain doses of fine seeds or fertilizers by rotating a shaft provided with a mechanical dragging element is recognized as a "drilling" type or DRAGGING DOSING DEVICE. Said dragging element may have various forms that allow it to fulfill its function. Depending on the construction features, these dragging elements can be presented as a single rotor for a variety of transport lines or a dragging element can be individualized by each transport line. The device that delivers the flow rate of seeds or inputs according to the requirements dictated by the dosing devices that work in conjunction with the secondary receptacles or hoppers, and that individually serve only one dosing device for the implantation or deposition of the seed in the ground, is recognized as an ON DEMAND SUPPLIER DEVICE.

GRANULAR INPUT is to be understood as any grain, seed or agrochemical compound in granular state, such as fertilizers, string trimmer, pesticides, etc.

PRIOR ART

With the aim of increasing their operational capacity, the size of agricultural implements increases continuously. In the case of seed drills and planters, they have adopted centralized storage systems for seeds and fertilizers consisting of large hoppers, increasing working autonomy and simplifying replenishment tasks. For "coarse grain" crops (maize, soybean, sunflower, etc.), in addition to the operational capacity, there is the need to provide the seed drill machines with devices with the precision required when implanting the seed, said devices generally called "single grain" for carrying out an individualized treatment of the seed are mounted directly on the planting body. The supply of the material to the respective "single grain" dosing devices is carried out by moving the seed from the main hopper, through a series of conduits, driven by an air current. The delivery of the material is regulated by a device that is installed at the base of the main hopper, with which communicates and receives the material contained in said main hopper, with which communicates and receives the material contained in said central hopper, generally by free fall or gravity.

The delivery devices mainly used for the purpose of the present invention comprise an air box having a bottom, side walls and a first front wall communicating with a pressurized air source, and a second posterior wall, with at least one air outlet entering said box.

The seed is delivered to the "single grain" dosing devices, which are mounted on the seed implanting unit. The "single grain" dosing device carries out the singulation or individualization of the seeds which consists in the action of taking seeds individually for the purpose of distributing them at the bottom of the furrow in a predefined amount per meter and at a constant distance.

For the seeding of fine grains, such as barley, wheat, rye, etc., delivery is achieved using the called "drilling delivery devices" that make use of means of delivery through dosing by dragging.

Depending on whether the seed drill is equipped with "drilling" or "single grain" delivery devices, they are classified respectively as "fine grain seed drill" or "coarse grain seed drill". In the cases in which such agricultural implement is enabled to fulfill both functions, these seed drills are called "combined seed drills". In order to achieve both working modes, a replacement of the delivery device installed at the base of the hopper and in communication with a "seed box" is carried out, placing the corresponding one, according to the working mode.

In the case of a known "combined" seed drill machine, with a centralized hopper in which the seed or input is transported by an air current from the delivery device located at the bottom of the hopper to the furrow opener, that is, it can implant both a drilling and a seeding with single grain dosing devices, this is possible by an adaptation of the delivery device according to the system intended to be employed. This adaptation is necessary due to the fact that on-demand supply systems do not have the capacity to perform dosing, and on the other hand, "drilling" dosing systems do not have the capacity to operate as an "on-demand" supplier.

In the following, the word "seed" includes all kinds of coarse grain seed, fine grain, or agrochemical granules.

In both recited systems, the seeds are moved to their final destination by an air current.

The seed enters the delivery device and is housed in the "seed box". This seed box is a physically defined section where either the "dragging rotor" operates, in the case of continuous flow operation, or the "containment slope" is used, in the case of on-demand supply. On the other hand, the delivery device is linked to a fan, which delivers a certain air flow rate that enters the "air box". The "air box" is a physically defined enclosure area where the air current is directed toward different outlets to act on the seed mass, depending on the operating mode.

On-demand delivery devices obtain this designation because the seed mass transported by an air current from the main hopper reservoir to the single grain dosing devices is displaced as a function of the air speed circulating in the circuit. That is, when an air current is established in the delivery circuit, a dragging of the input from said main hopper into the secondary hoppers or reservoirs of each dosing device is produced, and when the secondary hopper is filled with the seed agglomeration, an obstruction in the air transport conduit is produced, therefore, a decrease in the air speed is achieved. Taking into account that the displacement capacity of the seeds is proportional to the speed of the flow rate of the dragging air, the obstructions limit or stop the delivery of said seeds. As the dosing device delivers its stock of input, the level of inputs decreases, the obstruction of the conduit is released and the transport of seed through the air current is restored until the loading level of the secondary hoppers is completed again. A dynamic balance is achieved between the main and secondary hoppers based on the delivery speed of each dosing device. Said dynamic transport balance is called "on demand".

The dragging or drilling dosing systems consist of a rotating component, which determines a mechanical dragging element, such as for example, a rotor with a plurality of housings, capable of removing from the base of the hopper a certain amount of granular material according to its rotational speed. This is achieved in the known art by employing a rotatable component, provided either with alveoli, or with teeth or fingers. Both said alveoli or between adjacent pairs of said teeth or fingers accommodate a certain amount of granular material and when rotating they remove it from the seed chamber and tip it towards the injection chamber so that the air current transports them to the devices responsible for placing the fine seeds or granulated fertilizers in the soil or in the furrow. Single grain dosing systems are those in which the seed that is implanted in the bottom of the furrow is handled individually, so as to ensure a regular distance between one seed and the other. Distance between seeds is a function of the plant density specified for that crop. There are different ways to individually manipulate a seed. Some systems do so with rotating plates provided with cells that allow only one seed to be housed, and in this way move it individually. In other systems they rely on the seed adhering to the ports of a rotating perforated plate using an air current with either positive orvacuum.

Problems Encountered in Prior Art Constructions

In the following, in particular, but not exclusively, combined seed drills whose delivery device is linked and in communication with the bottom of the centralized hopper(s) of the seed drill shall be considered. Inside said device, when the dosing is by drilling, selectively a rotor is located inside a seed chamber provided with fingers or gears for the purposes already explained. In this arrangement, the seed is transported to the furrow opener by an air current. More particularly, without this constituting any limitation, particular reference will be made in the accompanying drawings of the delivery devices object of patent application AR P201 101923 of Jul. 10, 2018, by title SOLID PARTICLE ON-DEMAND DELIVERY DEVICE, APPLIED TO AN AGRI-CULTURAL MACHINE, of the same applicant, whose teachings for illustrative purposes only, are incorporated into this specification.

For the adaptation in the same seed drill for the delivery on demand combined, or with the single grain system, a modification must be made in the seed box, removing the aforementioned rotor and changing the manifold that provides the seeds at the outlet of the delivery device that forms an "injection chamber" of the seeds.

In combined seed drills this operation is usually complex and in various of the known machines the seed drill must be removed from service to produce the change of delivery system, or relatively complex operations must be resorted to in situ that comprise a certain period of time with the machinery inactive or dead time and often the use of tools, some of them of specific design for this purpose and that require technically specialized personnel.

On the other hand, in the case of machines with large central hoppers, where the use of each hopper is normally already defined due to the mechanical differences between the drilling or on-demand delivery devices existing at the base of said hoppers and in the absence of a facilitated interchangeability between both systems, in certain crops the load autonomy of the seed drills is not optimized. This is because it is not possible to replenish a hopper intended for dosing by drilling with coarse grain seeds, nor is it possible to supply the hopper that feeds a circuit of an on-demand system with coarse grains with solid fertilizers or fine grain seeds without first modifying the delivery system, that is, from drilling to on-demand and vice versa.

Likewise, in the event that the outlet of the injection chamber is plugged, it is necessary to achieve a quick and easy access to its outlet, clearing the conduits, and then reassembling the device with the same speed and simplicity without having to take the machine to the (mechanical) workshop, since this is not always possible with the known devices. For the adaptation in the same seed drill for the combined on-demand delivery, or with the single grain system, a modification must be made in the seed delivery box or seed box, removing the aforementioned roller and changing the manifold that provides the seeds at the output of the injection chamber.

Objects of the Present Invention

It is the object of the present invention is a set of agricultural implement, where it allows to carry out the transformation of the delivery system from a drilling device to an on-demand delivery device, and vice versa, carrying out said transformation quickly, without the eventual use of special tools, without the use of specialized technicians and remaining the seed machine in the same work site, that is, in the field where it is working.

It is also the object of the invention that said transformation can be carried out manually and by the same personnel who drive it, that is, without requiring a greater knowledge of specialized mechanics, achieving a maximum reduction in the transformation times of a combined seed drill, so that it remains for the shortest period of time.

It is also the object of the invention that the seed delivery chamber has a profile formed by its front partition and at least part of the vault or ceiling of the air chamber in communication with the seed chamber that is unchanged, that is, that defines a fixed and unchanged support and base against to which the drilling or on-demand device can be electively coupled, which, linked by appropriate means, copies the profile of said front partition and vault, allowing the rapid and simple withdrawal of said front partition from said injection chamber, attached to the front of the air chamber and in communication therewith.

It is an object of the invention that the main structure of the delivery system composed basically of the air chamber and the basic structure of the seed chamber is substantially unchanged and fixed to the bottom of the hopper in the seed drill when performing the exchange operation of the assembly that completes the delivery chamber of the seed and to the injection chamber of the seed, attached vertically to the front of the delivery device.

It is an object of the invention that in the case of the "dragging dosing" or "drilling" system, the seed mechanical dragging element with its surrounding functional elements/ components located in the seed chamber can be (interchanged and/or) modified quickly and without the use of tools.

It is the object of the invention that in the case of the "on-demand supply" system, the seed containment slope and its functional environment located in the seed chamber can be changed and/or modified quickly and without the use of tools.

It is an object of the present invention that the delivery system, more precisely the seed injection box, has a plurality of outlets that can be selectively closed quickly and without the use of tools in order to use the necessary outlets depending on the number of furrows of the implement.

SUMMARY OF THE INVENTION

Agricultural implement assembly, for the rapid transformation of a seed drill with a drilling or dragging dosing device, volumetric supplier to an on-demand supplier and vice versa, including at least one hopper containing a granular input, such as grains, seeds or granules of agrochemicals, and a delivery device arranged under the hopper.

This device has a structure consisting of two physically delimited areas. One of said areas hereinafter referred to as "seed box" has a direct connection with the hopper receiving the granular material, generally supplied by gravity, and another area hereinafter referred to as "air box", which has a connection with an air source such as a fan or the like.

The seed box is formed by side walls that delimit its width, a bottom wall, a rear wall with the air inlet from the fan, and a front partition that has at least the passage of the seed to the area where the dragging rotor is eventually located for the case of drilling work, or to the area where the containment slope is located for the case of on-demand supply. Preferably, the aforementioned partition has a plurality of outlets that can be selectively closed for the purpose of using said outlets based on the number of furrows served by the agricultural implement.

The top face of the seed box is open and communicates with the containing hopper. Inside the air box, the air is directed towards different outlets in order to act on the seed mass according to the working embodiment.

Particularly, the preferred construction of the present invention employs two air currents: one called "main current" and the other, called "secondary current". The air enters the air box driven by the fan or blowing unit and the main current leaves the box through the ports made in the front partition.

The secondary current passes through a seed mass and joins the main current within the injection chamber generating a dragging current capable of transporting the material to its final destination.

In the case of the drilling working mode, the material is delivered to the injection chamber due to the dragging action generated by a mechanical element and is dragged by the main current that does not possess any derivation in this case.

For the on-demand working mode, the material is delivered to the injection chamber by effect of the secondary current passing through the seed mass from the bottom of the seed chamber (or air box vault) through a screened surface. To this end, and without this constituting any limitation of the present invention, this secondary current can be regulated by means of the construction indicated in the aforementioned patent application P2018 01023 of Jul. 10, 2018, of the same applicant.

DETAILED DESCRIPTION OF THE PRESENT INVENTION

In order to succeed in exemplifying the preferred embodiment examples of the present invention, the following figures that illustrate them are attached, with the support of the description thereof given below, these embodiment examples must be interpreted as one of the many possible constructions of the invention, therefore it is not appropriate to assign any limiting value to it, including within the scope of protection of the invention the possible means equivalent to those illustrated; the amplitude of the present invention being determined by the first claim attached in the corresponding claim set.

Likewise, in these Figs., like references identify like and/or equivalent means.

Figure 1:
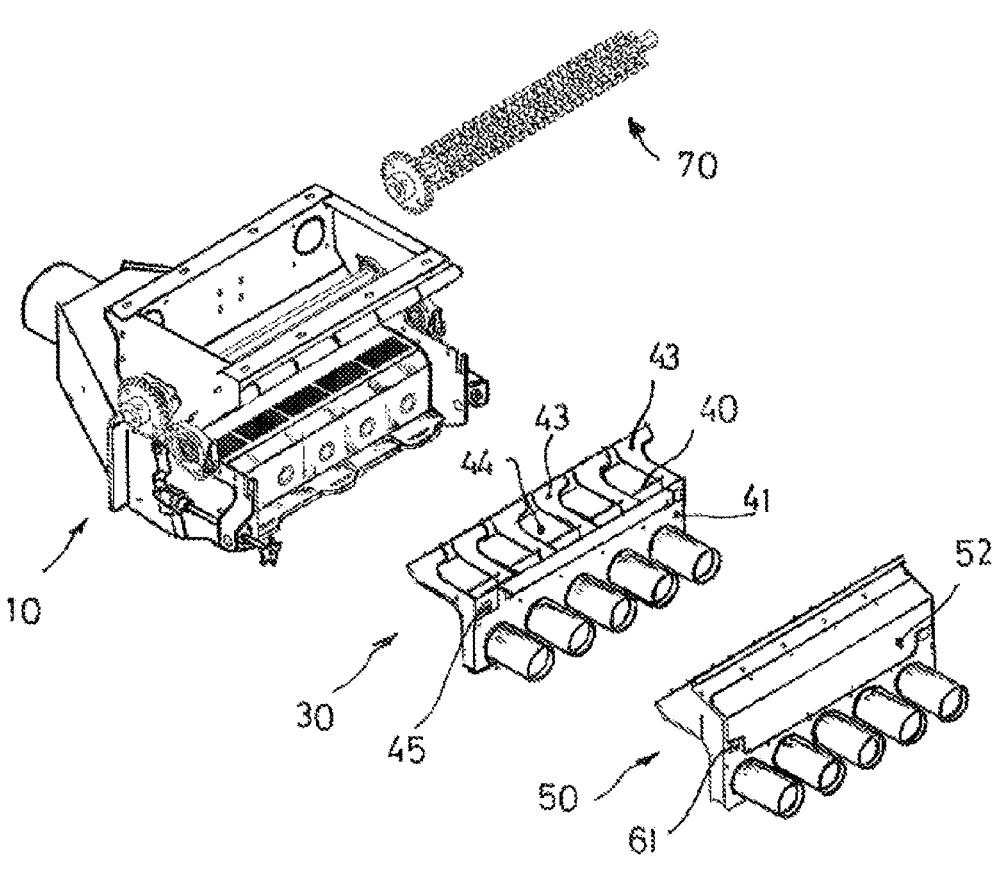
FIG. 1, shows in exploded perspective, in a schematic form, an air box of a delivery device of the invention, and separated therefrom, two preferred constructions of vertical seed injection chambers, respectively first and closest to the air box, the vertical seed injection chamber for a drilling or volumetric delivery system is seen which acts next to the dragging cylinder that is illustrated exploded, and then to the component of the vertical seed injection chamber for an on-demand delivery system.

Prior to the detailed analysis of the accompanying Figs. of the preferred exemplary embodiments, it is considered useful to make the following considerations related to the structure and operation of the components of the invention with the result obtained.

As already explained, the present invention consists of a structure consisting of two physically delimited areas. One of the areas, called "Seed Box" as already mentioned, has a direct connection with the containing hopper receiving the granular material therefrom, generally supplied by gravity and an area hereinafter referred to as the "air box" which has a connection with a blowing fan.

The "seed box" consists of respective side walls continuing the sides of the air box that delimit its width, a bottom wall, a rear wall that in the constructional arrangement of the examples has a cleaning gate and at least one seed passage to the area where the "dragging rotor" is eventually located for the case of drilling work or, to the area where the "containment slope" is located for the case of an on-demand supply. For the constructional arrangement of the example, the front partition has a plurality of outlets that can be selectively closed rapidly and without the use of tools for the purpose of using said outlets based on the number of furrows of the implement. The top face of the seed box is open and communicates with the containing hopper.

In the "air box" the air current is directed towards different outlets in order to act on the seed mass according to the working mode.

In particular, without limiting this, the present invention employs two air currents, one called "main current" and another "secondary current". The air enters the air box of the device from a blowing fan. On the front wall of said box, there are the outlet ports of the "main current" while, on the top part of said wall, there is a passage through which the "secondary current" circulates. The "secondary current" crosses a seed mass and is again joined to the "main current" inside the vertical seed injection chamber generating a "dragging current" that will transport the material to its final destination. In said chamber, both in the "drilling" working mode and in the "on-demand supply" embodiment, the granular material is deposited so that it is dragged.

In the case of the "drilling" working embodiment, the material is delivered from the "seed chamber" to the "injection chamber" due to the dragging action generated by a mechanical element or dragging dosing system.

For the "on-demand supply" working embodiment, the material is delivered to the "injection chamber" due to the effect of the air currents that intervene in this working embodiment.

According to the illustrated non-limiting examples and according to the aforementioned application AR P20180101923 the "secondary current" of air passes through the seed mass from the bottom of the seed chamber or the roof of the air chamber communicating with the above, through a screened plate, causing a sustenance effect of the seeds, in order to facilitate the dragging towards the "injection chamber". The flow of the secondary current is regulated by a mechanism defining a flow rate register, mechanically limiting the passage section.

The "main current" comes from the "air box" and enters the "injection chamber" by at least one port. The joining of the "secondary current" with the "main current" generates the "dragging current" which leaves the injection chamber through at least one port communicating directly with at least one conduction pipe via which the transport of the material is carried out.

For the purposes of being able to carry out the transformation of the system from the "drilling" working embodiment to a system in the "on-demand supply" working mode and vice versa, the present invention defines two functional sets that are timely exchanged in a simple way and without the use of tools and confer the condition of working in two different ways to the system simply opting for the placement of one or the other.

Both the called "drilling module" and the "supply module" have constructional and functional features specific to each working embodiment, however, their geometry allows them once installed in the "delivery device" to couple to the piping of the delivery circuit to transport the granular material to its destination.

The "drilling module" consists of a space physically delimited by at least one bottom, side walls and a first front wall communicating with the "seed chamber". The rear face is open and is in communication with the "injection chamber". For the constructional arrangement of the example and without this constituting a limitation, the rear face has a wall of low height that rises from the base acting as containment for the granular material. Within this defined space, the "mechanical dragging" element (rotor) is housed. Said element, receives the granular material from the seed chamber and due to its rotating action, it displaces a certain amount of granular material in each rotation, delivering it in free fall towards the "injection chamber". Said injection chamber has at least one inlet port that communicates directly with the "air chamber" and at least one outlet port that communicates with the circuit piping. Once the granular material enters the "injection chamber", the air current from the "air chamber" drives it into the delivery circuit piping through the outlet port.

The "supply module" consists of a space physically delimited by at least one bottom or base constituted by the aforementioned perforated or screened surface, side walls and a first front wall communicating with the "seed chamber". The rear face is open and is in communication with the "injection chamber". For the constructional arrangement of the example and without this constituting a limitation, this face has a wall of low height that rises from the base acting as containment for the granular material hereinafter referred to as "containment slope". The "containment slope" aims to retain the granular material that enters from the "seed chamber" due to the effect of gravity by depositing itself inside the chamber of the "supply module" according to its natural slope. The material will be kept in a resting state maintaining its natural slope until the air currents that put the on-demand supply system into operation act thereon.

The secondary current coming from the "air chamber" enters the "supply module" through the perforations of its base and passes through the seed mass generating a sustenance effect on the seeds.

The "injection chamber" has at least one inlet port that communicates directly with the "air chamber" and at least one outlet port that communicates with the circuit piping. Through the inlet port, an air current enters from the "air chamber" at high speed. This air flow, called "main current" generates by "Venturi" effect, a negative pressure area at the top of the injection chamber. This negative pressure varies its intensity depending on the speed with which the air passes through the "injection chamber". The maximum air speed condition within the "injection chamber" occurs when the circuit piping is clear at its end, i.e. without accumulation of granular material in the secondary hopper. In this condition of maximum speed and, therefore, maximum negative pressure in the top of the injection chamber, the seeds of the surface of the seed mass retained by the "containment slope" tend to be dragged towards the injection chamber. This condition is favored by the effect of the "secondary current" since it generates a sustenance effect minimizing the amount of energy necessary for the material of the surface to be dragged towards the injection chamber. Both the "secondary current", which passes through the seed mass, and the main current generating the negative pressure and the dragging effect, are joined to exit through the outlet port forming what is called a "dragging current".

In FIG. 1, the perspective of a delivery box construction indicated with the generic reference (10) is seen, with the modifications thereof of the present invention and, seen exploded in the same perspective are the component that makes up the vertical seed injection chamber that allows to configure a drilling or volumetric delivery device indicated with the generic reference (30), and the component that makes up the vertical seed injection chamber that allows to configure an on-demand delivery device indicated with the generic reference (50), according to the main object of the present invention, that is, the possibility of constructing a volumetric delivery device and selectively converting it into an on-demand delivery device, using the same delivery box (10) of the seed drill machine. Also, in this Fig. one of the many seed dragging cylinders is identified by the generic reference (70) for the drilling or volumetric delivery device.

Figure 2:
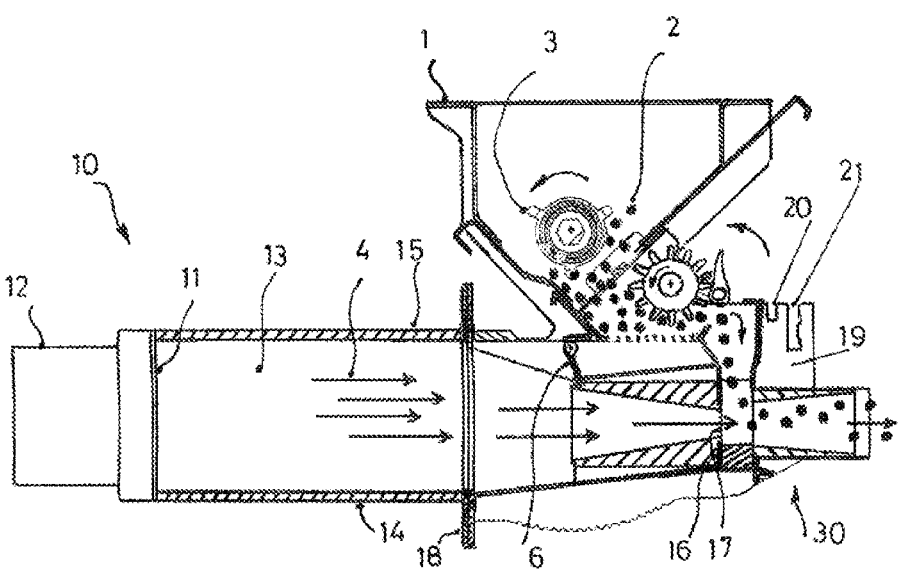
FIG. 2 schematically shows a vertical cutoff of a generic hopper, on the base of which the seed delivery box and the vertical seed injection chamber with dragging cylinder have been installed forming a drilling or volumetric delivery device according to the present invention.

In FIG. 2, the longitudinal vertical cutoff of a vertical seed injection chamber of a drilling or volumetric delivery device (30), associated with the delivery box (10), is seen. It is seen in the Fig. that the delivery box (10) is formed by an air chamber that has a rear wall (11) with the inlet (12) of the air (4) under pressure that comes from a blowing means (not illustrated), such as an air pump, a turbine, fan, compressor, etc. The delivery box (10) has side walls (13) that delimit its width, a bottom wall (14), a top wall or vault (15) and a front partition (16) establishing at least one outlet (17) of the air current from said delivery box. Said box with the components described heretofore is generic. Without this being limiting and exclusive, by way of example only, the delivery box (10) may be composed of two sections as shown in FIGS. 2, 3, 4 and 5, with an intermediate flange (18) linking both parts thereof. Such delivery box (10) is linked to the bottom of a hopper (1) also generic, in which the granulated seeds (2) is loaded, such as grains, seeds or granules of agrochemicals, (hereinafter "seeds") being able to have inside the hopper and adjacent to its bottom a rotating stirring medium (3) in a conventional manner.

Figure 3:
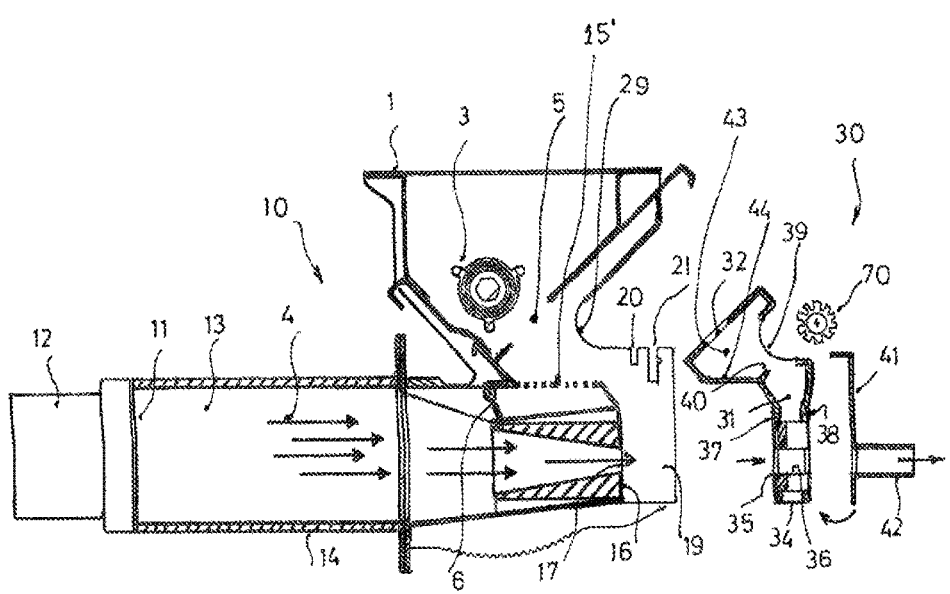
FIG. 3 schematically shows the components of the vertical cutoff of FIG. 2, with the vertical chamber and dragging cylinder being exploded.

In FIG. 3, shown schematically in exploded longitudinal vertical cutoff is the vertical seed injection chamber of a drilling delivery device (30) of FIG. 2, associated with the delivery box (10). In said Fig. it is observed that if there is a derivative air communication towards the top wall or vault (15) that communicates from below with the opening (5) at the bottom of the hopper with the seed chamber, this derivative air current is canceled when the register (6) is closed so that the entire air current (4) is passed through the delivery box (10).

According to the present invention, this generic delivery box (10) has its side walls (13) continued downstream of the direction of the air current (4) by means of respective parallel wall portions (19) extending substantially vertically forward in a short distance, having at their top edges two blind vertical slots (20) and (21). In the construction of the vertical seed injection chamber of a drilling or volumetric delivery device (30) of the invention that is installed against the front partition (16) (downstream) of the delivery box (10), seen in FIG. 3 in its schematic exploded and in vertical cutoff view thereof, the existence of a vertical chamber (31) that has one or more inlets (32) that provides the seed from the seed chamber located above and below the hopper, in communication with it, arranged adjacent to each other between both parallel wall portions (19) of the front end of the delivery box (10) and all of them in communication with the outlet (5) of the bottom of the hopper. The aforementioned vertical chamber (31) can have a closed bottom (34), with air inlets (35) to passages (36) open at both ends and in direct axial alignment communicating with the air outlets (17) of the delivery box (10), and subsequently has a wall (37) that is the one that is attached against the front partition (16) of the delivery box (10), and separated from (37) another downstream wall (38), being preferably (37) parallel to (38) in its bottom portions adjacent to the passage (36). In a superior manner, this vertical seed injection chamber of a drilling or volumetric delivery device (30) has a circular notch (39) in which houses a dragging cylinder (70) which, when rotated in an anti-clockwise drags the seeds from the seed chamber and accumulates them against a small slope (40), and said seeds when exceeding the level of the slope (40) fall through the vertical chamber (31) where they are dragged by the air current (4) coming from the outlet (17) and passages (36). This vertical seed injection chamber of a drilling or volumetric delivery device (30) is arranged between the parallel wall portions (19) projecting from the front end of the delivery box (10) and is linked thereto. Preferably the circular notch (29) corresponds to the notches (39) of the vertical seed injection chamber of a drilling or volumetric delivery device (30) so as to accommodate the cylinder (79) rotating about its axis.

Figure 4:
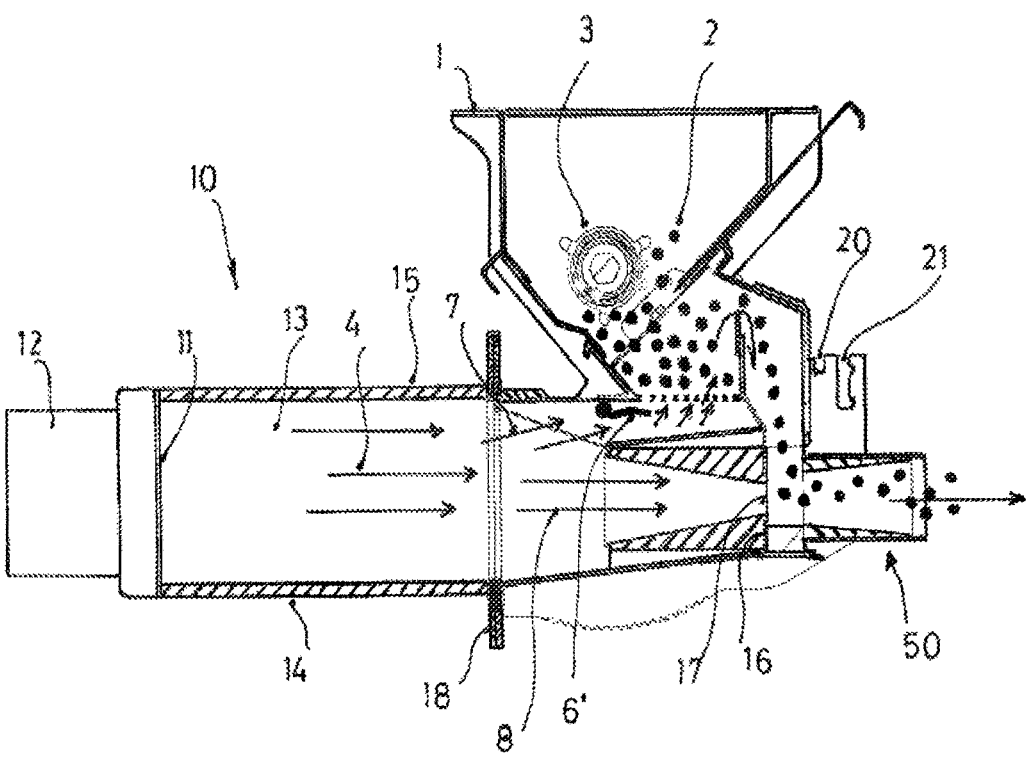
FIG. 4 schematically shows a vertical cutoff of a generic hopper, on the base of which an air box and the vertical seed injection chamber have been installed in communication with the seed box, forming an on-demand delivery device according to the present invention.

Preferably, this vertical seed injection chamber of a drilling or volumetric delivery device (30) is completed by a plate (41) which is attached against the downstream wall (38) or outer wall of the vertical chamber (31), substantially vertical plate which is also linked thereto in the parallel wall portions (19). Ideally this plate has so many open pipes (41) at both ends and aligned with the passages (36) of air outlet with the seeds. (See arrow at the right end of FIG. 3). FIG. 4 allows to observe the longitudinal vertical cutoff of an on-demand delivery device (50), associated with the delivery box (10). Seen in the Fig. are the same references for said delivery box (10), with the only difference that in a preferred but not exclusive construction of the invention, this delivery box (10) presents its vault screened or permeable to the passage of air (15') in association with the fall of the seeds (2), said seeds being subjected to an upward air current (7) or secondary current derived from the air current (4) when the register (6') is opened for diverting in this air current (4) in two currents (7) and (8), said current leaving the front partition (16) of the delivery box (10) through the at least one outlet (17) from said box.

Figure 5:
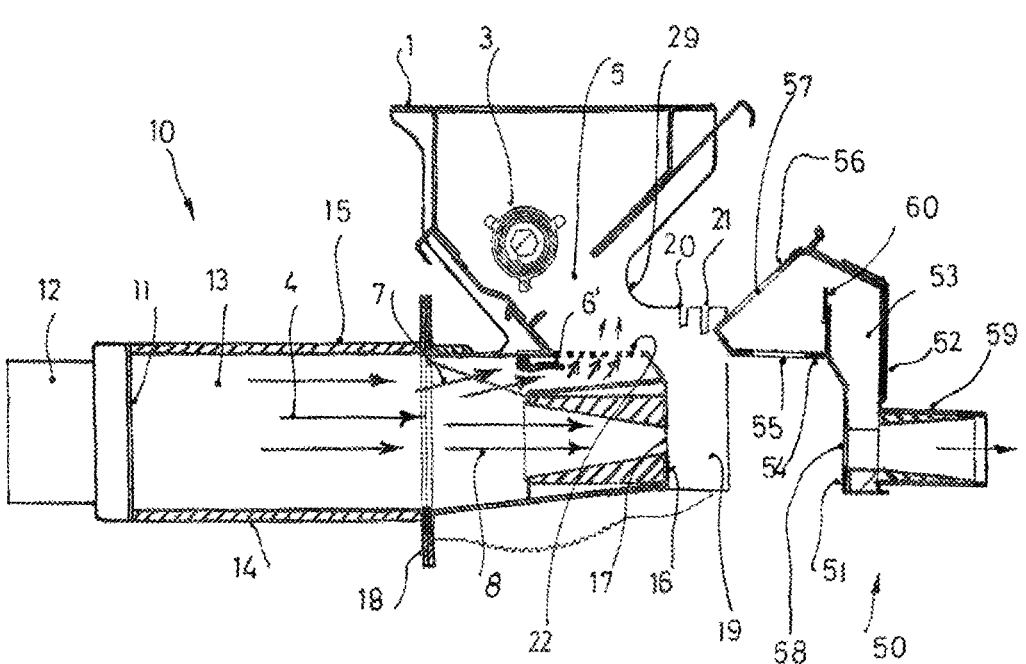
FIG. 5, schematically shows the components of the vertical cutoff of FIG. 4, with the on-demand vertical seed injection chamber being exploded.

In FIG. 5, a schematic detail of one of the possible constructions of the vertical seed injection chamber of an on-demand delivery device (50) that conforms to the on-demand delivery device is provided. This vertical seed injection chamber of an on-demand delivery device (50) preferably has a first rear wall (51) that is attached against the partition (16) and a second front or downstream wall (52), a vertical chamber (53) being established between both of them. After the first rear wall (51), where the top edge of the front partition (16) of the delivery box (10) ends, this wall (51) is folded back in a corner (54) meeting with the slope (60), substantially parallel to the screened partition (22), where the derived air current (7) or secondary air current leaves, with an opening or passage (55) that delimits the screened area, to then be obliquely continued upwards in above (56) the passage (57), with a passage (57) matching with the outlet (5) of the seeds. Inside the chamber (53) there is a slope (60) from whose crest the seeds that fall into the chamber (53) are poured, where they are received by the air current (8) that enters through the passage (58) open at the bottom of the vertical chamber (53) at both ends in alignment and axial and in communication with the air outlet (17), from where the seeds are driven through the conduits (59) towards the seed drill's own dosing means (not illustrated).

Figure 6:
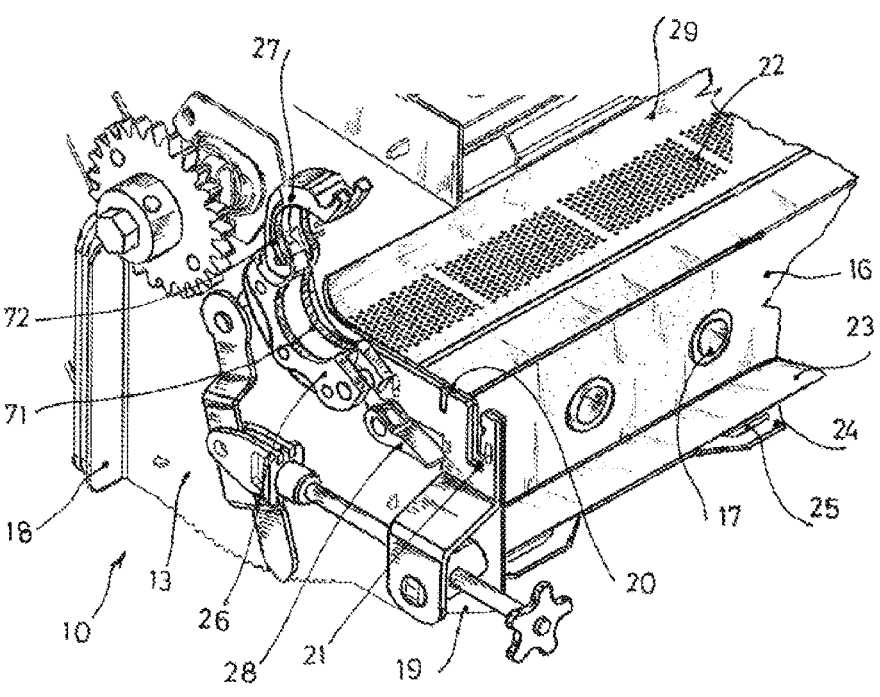
FIG. 6, shows in top perspective of the front end of the air box, with a preferred construction of the fastening and linking means of the selectively detachable dragging roller (not illustrated in this Fig.) in the open condition, and of the means capable of receiving the selectively fastening and linking devices of the vertical chamber to the front wall of the box according to the present invention.

In FIG. 6, the partial top front perspective of the delivery box 10 is seen. It is seen how the parallel extensions (19) of the sides (13) project downstream of the front partition (16) of the box or air chamber (10). Only one such extension (19) is illustrated in this Fig., which is clearly seen in FIG. 7 below. A small plane (23) extends between both wall portions (19) is originated at the bottom edge of the partition (16), and the free edge of (23) has a series of tabs (24) each of which delimits a recess (25), preferably through.

Against each of the sides (13), in axial alignment with the circular recess (29) the existence of respective circular hemi-clamps respectively (26, 27) is observed, which in the Fig. are observed in their open clamp condition, ready to receive the corresponding end of the dragging cylinder (70) (not illustrated in this Fig.). The bottom portion (26) can remain fixed to the outside of the wall (13), and at its rear end the folding portion (27) is articulated. The top end of (26) has coupling means (28) linking both clamp components (26, 27) to each other in a secure closing relationship. Each clamp portion (26, 27) has, respectively, a semi-cylindrical inner seat (71,72) that defines the track within which the respective stub of the dragging cylinder (70) rotates about its axis. By closing the components (26, 27) of each clamp on the stub, the dragging cylinder (70) is left with a single degree of rotating freedom.

Figure 7:
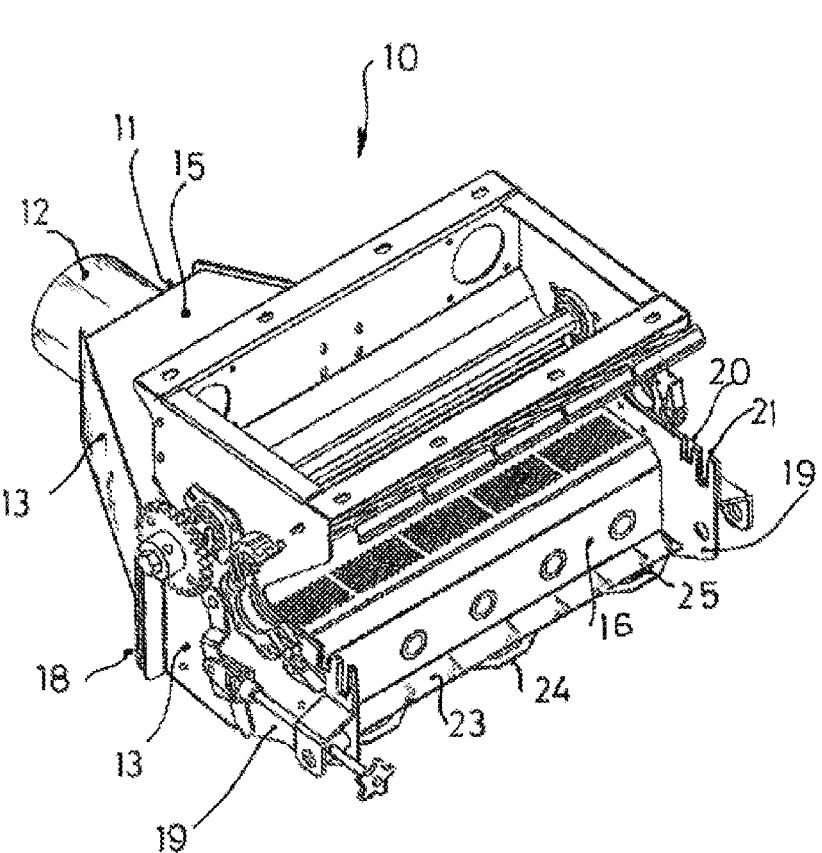
FIG. 7 shows in perspective to said air box of FIG. 6, without the dragging roller and in the act of receiving the component that defines the vertical seed injection chamber of the drilling or volumetric delivery device, according to the present invention.

FIG. 7 shows the delivery box (10) with the vertical seed injection chamber of a drilling or volumetric device (30) in the act of its installation to the box, without the cylinder (70) for the purposes of clarity of the FIG. 1*n* actual practice, in order to achieve the volumetric distributor, obviously once the vertical seed injection chamber of a drilling or volumetric device (30) has been installed, the dragging cylinder (70) must be installed and its end stubs secured to the respective clamps (26, 27).

Figure 8:
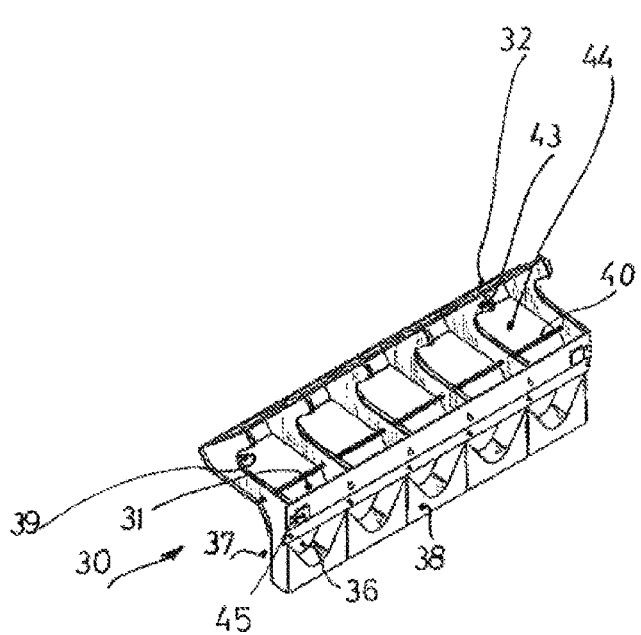
FIG. 8 shows a preferred embodiment of the vertical seed injection chamber of the drilling delivery device, without the dragging roller and without the fastening and linking means of said vertical chamber to the front wall of the air box of a delivery device according to the present invention.

FIG. 8, shows in perspective the vertical seed injection chamber of a drilling or volumetric device (30), and in said Fig. it is observed that preferably the interior of the vertical seed injection chamber of a drilling or volumetric device (30) has a plurality of vertical partitions that seat against a surface (44) upstream of the slope (40) that subdivide the interior of the vertical seed injection chamber of a drilling or volumetric device (30) in a plurality of enclosures one after the other, serving each enclosure to a respective outlet (36).

Figure 9:
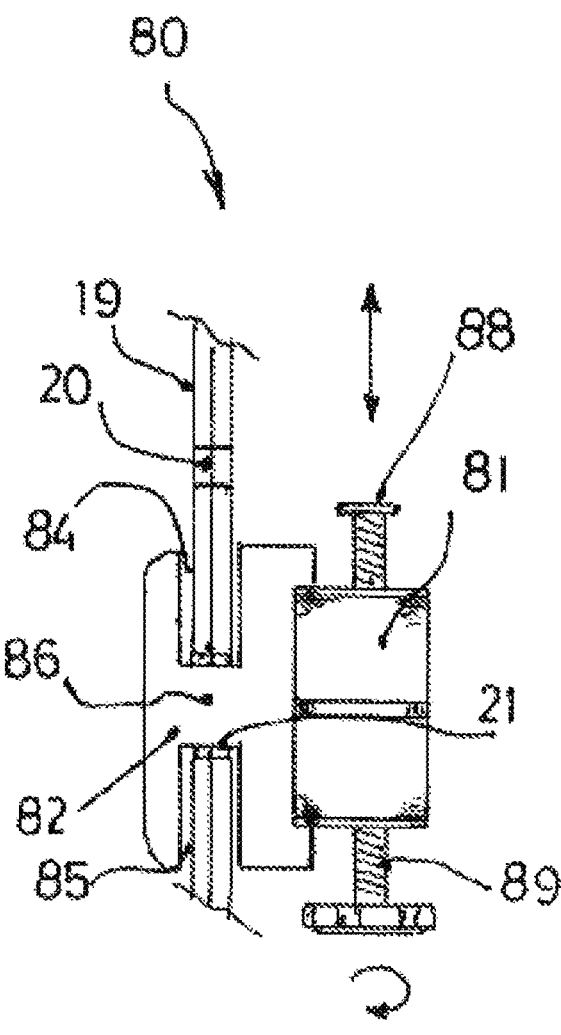
FIG. 9, shows in top view a preferred construction of the holding and assembly means of the vertical chamber to the air box of a delivery device.

FIG. 9, shows on top plan one of the possible construc- tions of the holding and linking means (80) of the chambers, both the vertical seed injection chamber of a drilling or volumetric device (30) and the vertical seed injection cham- ber of an on-demand delivery device (50), against the partition (16) of the delivery box (10). This preferred linking device has a body (81) of which two cantilevered wings (82, 83) are joined, separated and parallel to each other and arranged projected on top of each other. Only the top (82) can be seen in the Fig. since this is a top plan view. In each wing (82, 83) two facing blind notches (84, 85) are made on the same line, so that the notches (84,85) of one of the wings (82) correspond vertically aligned with the notch in the other wing (83), presenting between the blind bottoms of each pair of facing notches of each wing a portion of wing (86) of a width equivalent to the width of the blind slot (21) present in each vertical wall (19). To assemble and retain each vertical chamber, once said chamber is presented against the wall (16), this device (80) is inserted into each slot (21) so that the notches are left with a single degree of freedom upwards stopped by said side walls (19), seating the portions (86) therein, and the end (88) of a screw (89) is pressed against the portion (45) of the outer face (38) of the vertical seed injection chamber of a drilling or volumetric device (30), or against the portion (61) of the outer wall (52) of the vertical seed injection chamber of an on-demand delivery device (50). This screw end (88) strongly presses the down- stream wall portions (45) of the downstream wall 38 of the vertical seed injection chamber of a drilling or volumetric device (30) or the device vertical chamber portions (61) and vertical seed injection chamber of an on-demand delivery device (50), depending on which chamber is installed to the delivery box (10), ensuring contact of the wall (37) or the wall (51) against the front partition (16), respectively, and maintaining the alignment of the outlets (17) with the corresponding passages (36, 58) stable.

Figure 10:
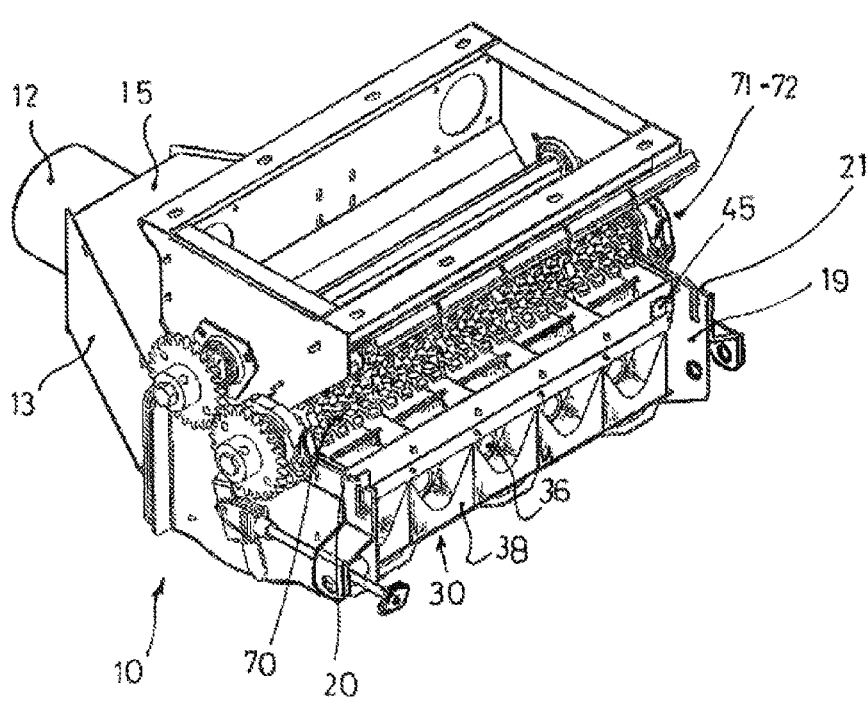
FIG. 10, illustrates a perspective of the seed delivery box, in its version of a drilling delivery device, with the roller already installed and secured to the seed chamber, without illustrating the fastening and linking means, in a preferred embodiment in which said vertical seed injection chamber is composed of two pieces attached to them to facilitate the inspection, cleaning and eventual plugging of seeds, without having to dismantle all said vertical chamber.

FIG. 10, shows in perspective the camera 30 already installed and with the roller (70) placed in site and with the clamps (71-72) closed on the stubs (see FIG. 17) of the dragging roller. The linking devices (80) are not shown in the Fig.

Figure 11:
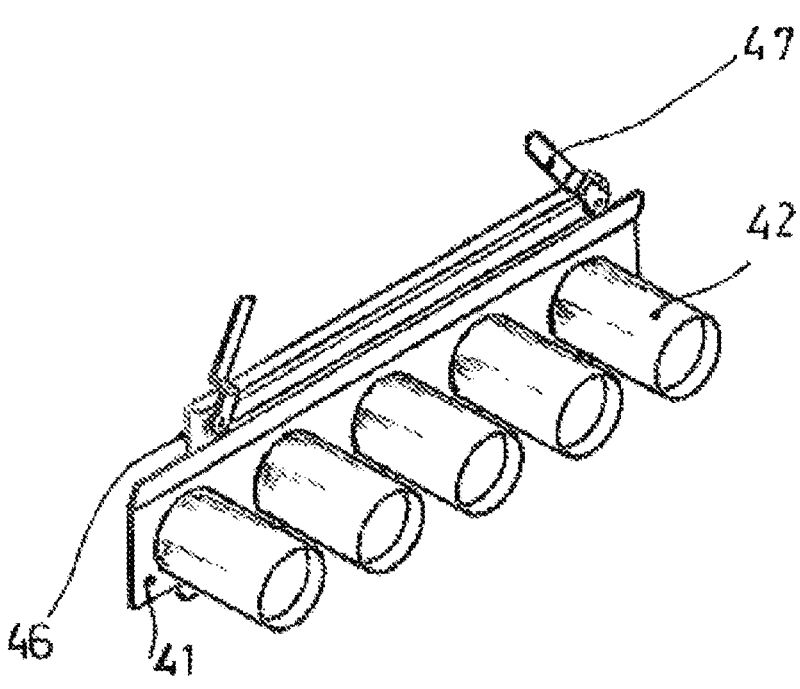
FIG. 11 illustrates in the same perspective said second exploded component, in the act of being presented for installation to the rest of the vertical seed injection chamber of a delivery device according to the present invention.

FIG. 11, shows in perspective the plate (41) in which it is detailed that at the ends of the top edge it has respective notches (46) that leave free the end (88) of the screw (89) and at the same time independent the linking of this plate (41) against the front face (38) of vertical seed injection chamber of a drilling or volumetric device (30). The plate (41) is linked to the slots (20) by adjusting the fastening bars (47) seated therein.

Figure 12:
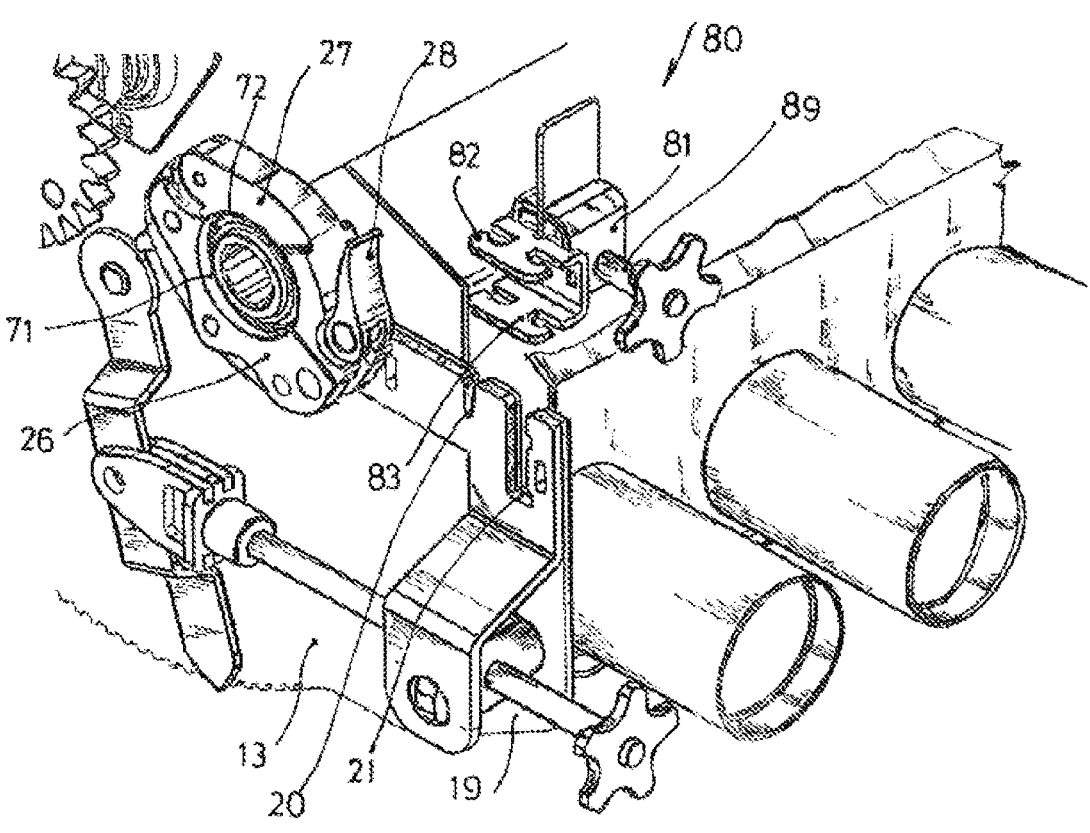
FIG. 12 shows a partial perspective of the on-demand delivery device, with the component of the vertical seed injection chamber already assembled to said air box, in the act of being installed by the linking and adjusting means of the aforementioned vertical chamber to the front wall of the air box.

In FIG. 12 detailed is an enlarged and partial perspective view of the delivery box (10), to which a vertical chamber, either the vertical seed injection chamber of a drilling or volumetric device (30) or the vertical seed injection chamber of an on-demand delivery device (50), has been installed, and the Fig. seen is the use of one of the adjusting means (80) at the time of its installation to the slot (21), and to the closed clamp (27, 26), illustrating the circular seat (71, 72)

for the roller stub (not illustrated in this Fig.), and the position of the closing lever (28) ensuring the closing of the clamp.

Figure 13:
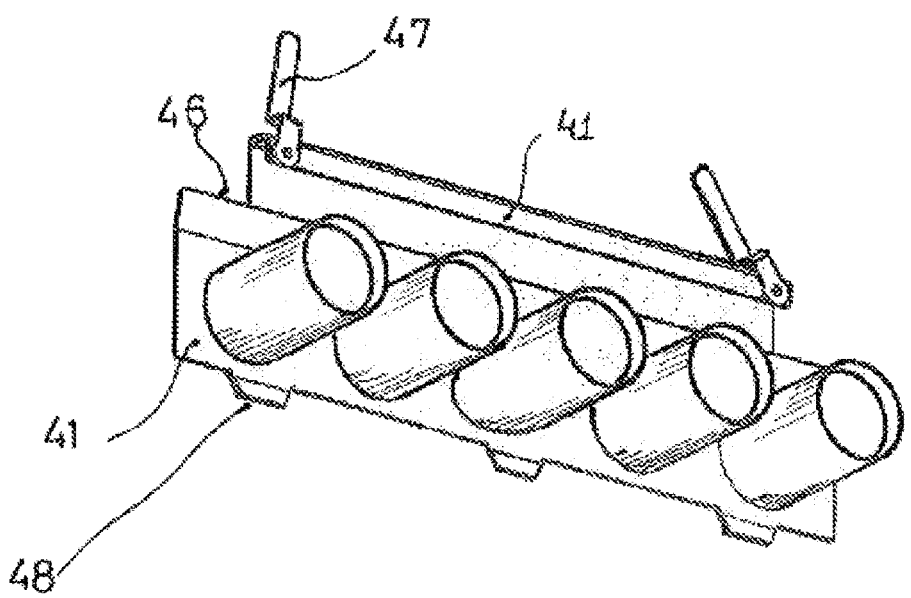
FIG. 13 shows a perspective of the second component of the vertical seed injection chamber of a volumetric delivery device, with its top linking and holding means ready for assembly, likewise showing at the bottom edge of said second component a sign of linking projections from the bottom end thereof to the first component of the vertical seed injection chamber of this device. Seen in FIG. 14 is an isolated top view of the second component of the drilling or volumetric delivery chamber with the top fastening means thereof to the sides of the delivery box in its adjustment and holding position.

FIG. 13 shows a perspective of the plate (41) which has spaced projections (48) projecting from its bottom edge, which are inserted into reliefs or recesses (25) belonging to tabs (24) vertically aligned with (48) from the horizontal wall portion (23) extended between both wall portions (19).

This relationship of means (48, 25) allows to first link the bottom end of (41), and then fix the top portions by means of the fastening bars (47).

Figure 14:
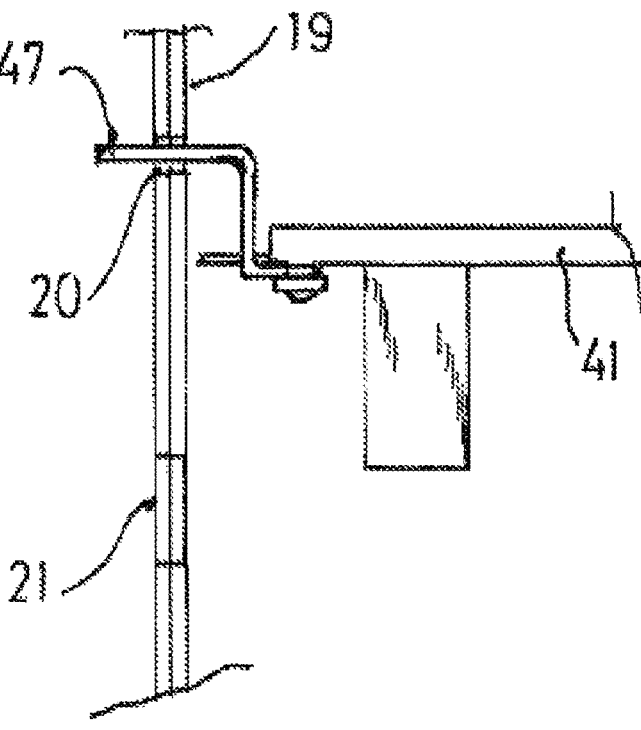
Figure 15:
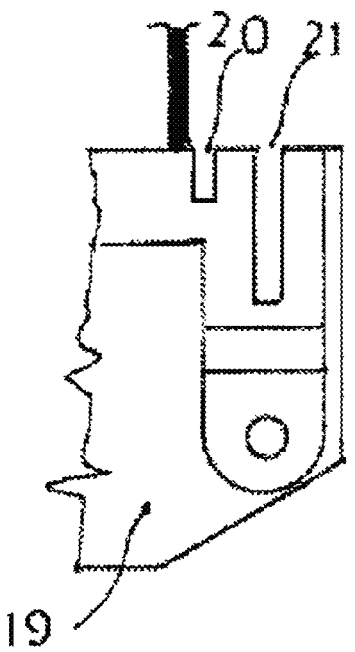
FIG. 15, allows to appreciate in a side elevation view an isolated detail of the left side of the box, which extends substantially vertical according to the present invention, and in which it is possible to observe a preferred construction of the seats of the holding means of the components that make up the vertical chamber, applicable to both versions (volumetric or on demand) of the delivery device, said seats consisting of vertical slots of blind bottom.
Figure 16:
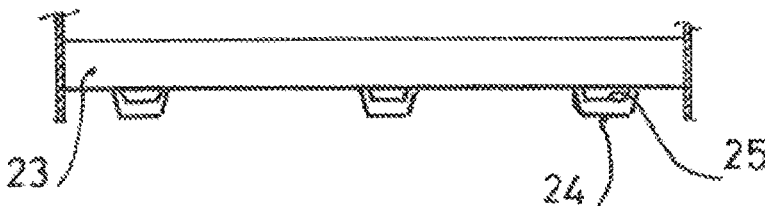
FIG. 16 shows a top plan view of a particular preferred constructional detail of the invention, which consists of a flat bottom projection that continues the floor of the air chamber delimited by both lateral extensions thereof, with a series of housings for as many connecting projections of the bottom end of the second component illustrated in FIG. 13.

FIG. 16 has in top plan the horizontal wall portion (23) already mentioned, with the tabs (24). FIG. 13 shows the shape of the notches (46) and the fastening bars (47). Said bars (47) pivot and are inserted (see FIGS. 14 and 15) into the slots (20). Please note that according to the preferred construction of the invention the slots (20) are located behind the slots (21) which makes it possible to ensure that the plate (41) is pressed against the front wall (38) of the vertical seed injection chamber of a drilling or volumetric device (30). The reason for the existence of this plate (41) separated from the vertical seed injection chamber of a drilling or volumetric device (30) is due to the fact that by removing it is possible to unlock and/or clean the outlets of the vertical chamber (31) without having to remove the roller (70).

Figure 17:
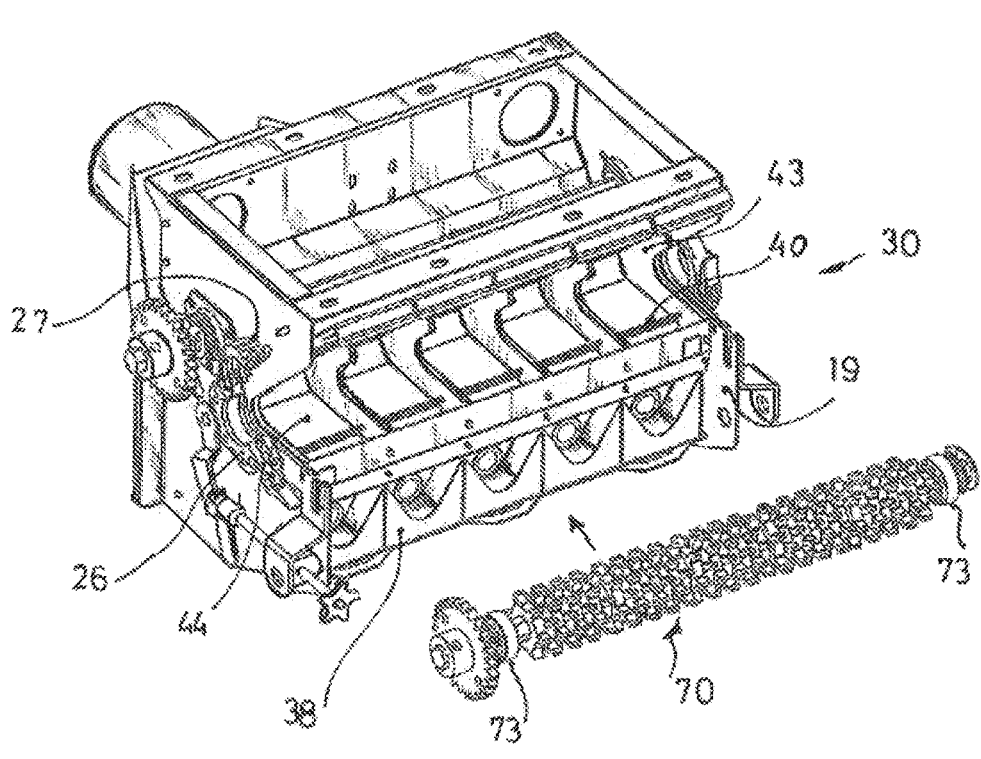
In FIG. 17, in a top perspective the seed box is seen, with the first component of the vertical seed injection chamber of the volumetric delivery device being already installed (without the fastening and linking means) and with the dragging cylinder separated, at the time prior to its installation, with the fastening and holding means thereof open.

In FIG. 17, we observe a top front perspective of a delivery box (10) that already has assembled to the vertical seed injection chamber of a drilling or volumetric device (30), without the plate (41), and with the cylinder (70) presented prior to its installation in the circular seats of the clamps (26, 27). It is seen in the Fig. the end stubs (73) of said roller which rest on the circular seats (71,72) of said clamps.

Figure 18:
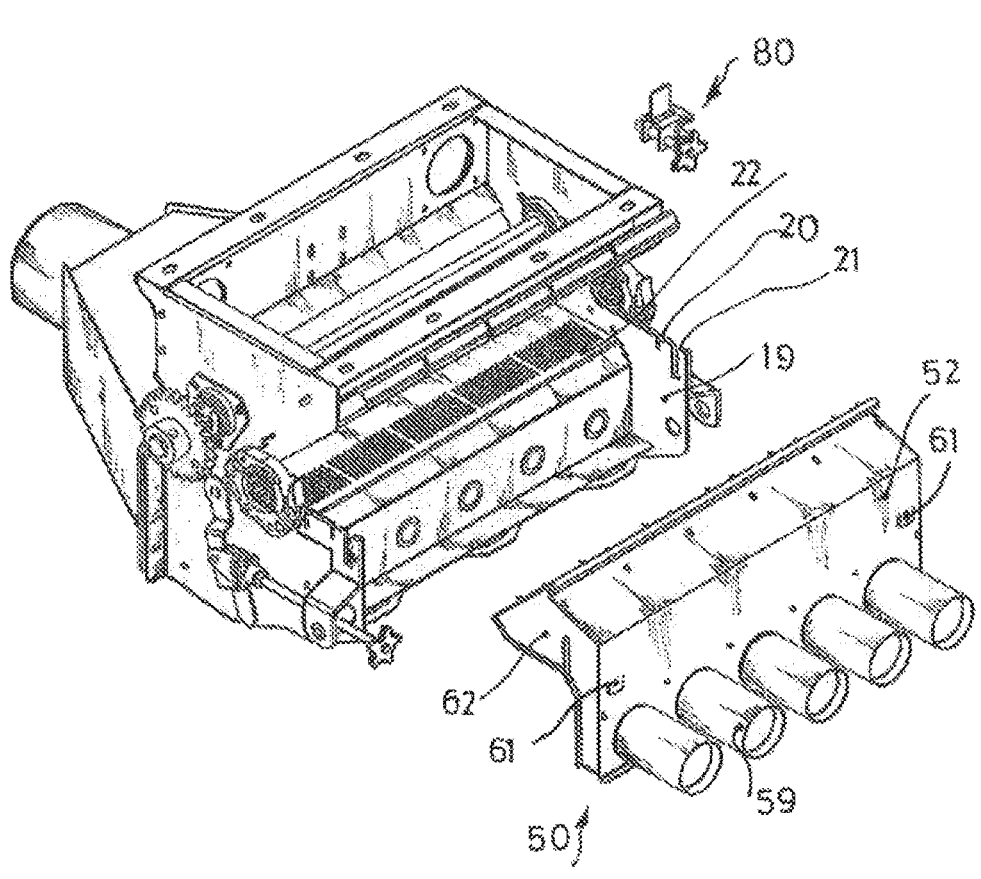
FIG. 18, shows in a top perspective the seed box, with the component of the vertical seed injection chamber of the on-demand delivery device being separated therefrom and prior to its assembly, also being shown separately to one of the linking and adjusting means of said chamber to the box.

FIG. 18 allows us to observe a top front perspective of a delivery box (10) which according to the present invention has the protruding side walls (19) with the slots (20, 21) for linking and holding the vertical chamber. In the act of being inserted, a holding and adjusting device (80) is observed cut off and in the same perspective and separated from said delivery box (10) the vertical chamber for an on-demand delivery device (50) is shown, at the instant prior to its coupling to said delivery box (10), in which its side walls (62) are detailed.

Figure 19:
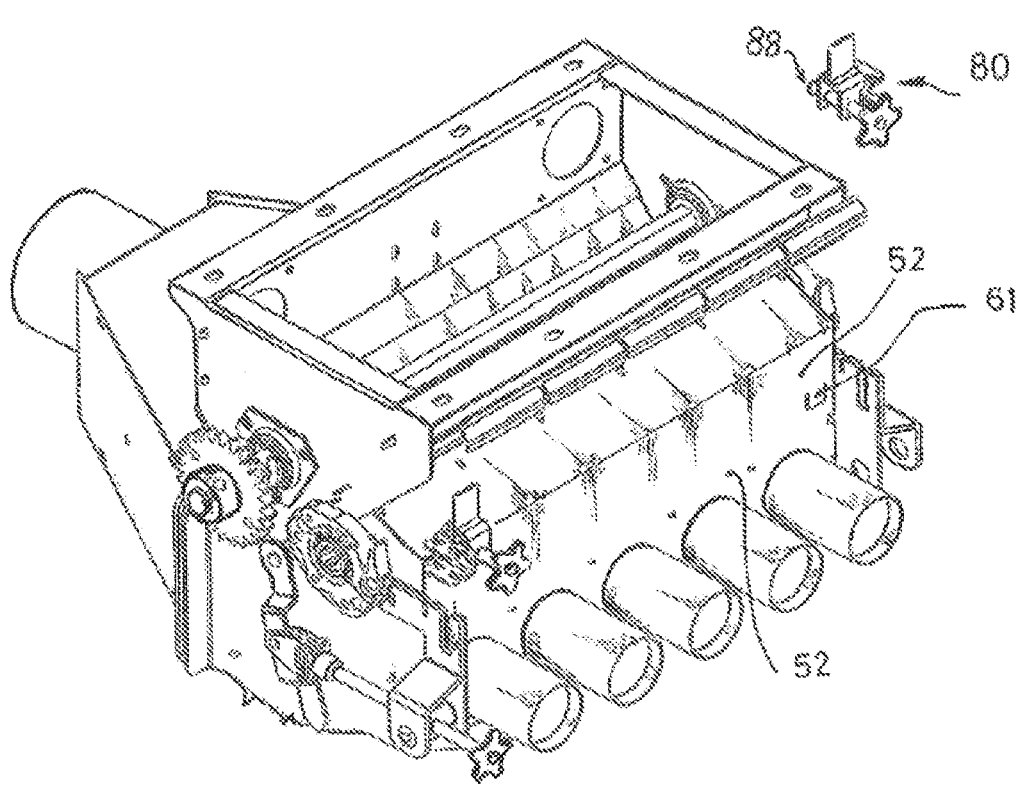
FIG. 19, allows to appreciate in a top perspective to the delivery box, with the component of the vertical chamber of the on-demand delivery device being already assembled, and with both linking and adjusting means of said chamber to the box being separated at the time prior to assembly.

In FIG. 19, the same components of FIG. 18 are shown, but with the vertical seed injection chamber of an on- demand delivery device (50) already assembled against the delivery box (10) and in the process of being adjusted using the elements (80). It is noted in both figures that when the cylinder (70) is removed, the clamps are closed and ready and without holding the dragging cylinder (70) which must be removed if the delivery device is converted to one on demand, as shown in the aforementioned FIGS. 18 and 19.

The invention claimed is:

1. An agricultural implement assembly for rapid transfor- mation of a seed drill combined with a dragging or drilling seed dosing device to a supplier on demand comprising:

at least one hopper containing a granular input and a delivery device arranged below and in communication with said hopper, said delivery device comprising a delivery box having respective side walls delimiting its width, a bottom wall, a top wall in communication with a seed chamber from the hopper, a rear wall having an inlet of an air current, and a front partition establishing at least one outlet for at least one granulated input dragging air current from said delivery box, wherein attached against said front partition and at least part of said top wall of the delivery box is arranged a removable seed injection chamber, using holding and linking means and copying a profile of the front partition and top wall, said removable seed injection chamber having two interchangeable and distinct injection chamber construction variants;

a first variant of the two interchangeable and distinct injection chamber construction variant comprises at least a first chamber wall attached to the front partition of the delivery box, a second chamber wall separated from the first chamber wall by establishing a passage between both the first and second chamber walls and a bottom, said first chamber wall being formed by a blind wall that copies a profile of the top wall of the delivery box, and portions of side walls;

in at least part of a roof or vault of the first injection chamber providing a communication of an interior of said first injection chamber with the delivery box which in turn communicates with the bottom of the hopper, establishing an entry of the inputs from the hopper to said seed chamber and from there to the injection chamber;

in portions of the side wall of the delivery box and above a top wall thereof there are seats of a respective end of the axis of a cylindrical body, with fastening and holding means, said cylindrical body being rotatable about its axis inside the seed chamber, and interposed and facing the communication between said hopper and seed chamber, said cylindrical body providing mechanical dragging means of the inputs towards said seed injection chamber and forming a drilling delivery device therewith;

a second variant of the two interchangeable and distinct injection chamber construction variant comprises a first chamber wall attached to the front partition of the delivery box, a second chamber wall spaced from the first chamber wall establishing a passage between both walls and a bottom, said first chamber wall being at least partly permeable to the passage of a second air current from an air chamber into the seed chamber, which copies a profile of the top wall of the air chamber, having a roof or vault of the injection chamber of the second injection chamber wall and portions of side walls;

a partition being disposed adjacent to the top end of the first chamber wall of the injection chamber projecting towards the roof or vault of said injection chamber, establishing a passage between a free edge of said partition and said roof or vault, the partition defining a retention slope by overflow of the granulated inputs, forming a supply device on demand;

between said first and second walls, at least one communication is substantially aligned with the at least one outlet of a main air current of the delivery box, the second wall of the seed injection chamber having at least one air outlet in communication with the granulated inputs to the ground.

2. The agricultural implement assembly according to claim 1, wherein the side walls of the delivery box extend forward providing respective wall portions spaced apart from each other and following said front partition, seated between said two walls the sides of the injection chamber of the first variant or the second variant.

3. The agricultural implement assembly according to claim 2, wherein the side walls of the delivery box that extend forward are vertical and parallel to each other, with the holding means of the seed injection chamber being selectively detachable therefrom arranged below the aforementioned a seat of the axis end providing a support by pressing the first vertical chamber against the front partition of the delivery box.

4. The agricultural implement assembly according to claim 1, wherein a drilling or volumetric delivery device composed by said chamber by a first vertical chamber wall, a second vertical chamber wall, defining between both a vertical chamber, and side walls, comprising a plurality of partitions separated from each other and arranged between the side walls, defining between said plurality of partitions the inputs to the interior of the injection chamber and all of them in communication with the outlet of the bottom of the hopper;

said first vertical chamber wall has a plurality of air inlets communicating with open passages at both ends with respective air outlets of the air box present in the front partition thereof;

the first vertical chamber wall is arranged attached against the front partition of the air box;

above the sides of the injection chamber, a housing is provided in the form of a semicircular notch housing a dragging cylinder linked by its ends to extensions of the side walls of the delivery box seating in selectively detachable linking and holding means.

5. The agricultural implement assembly according to claim 1, wherein the seed injection chamber provides an on-demand delivery device, said injection chamber being formed by a first vertical chamber wall attached against the front partition of the delivery box and a second vertical wall, a vertical chamber being established between both;

the first vertical chamber wall has a top edge that matches a crowning of the front partition of the delivery box, folding there backwards with an opening or passage that delimits a corresponding vault area of the delivery box against which it is attached, to then be continued obliquely upwards in a passage coinciding with the exit of seeds from the hopper;

inside the vertical chamber there is a slope whose crest defines a spillage edge of the seeds which fall inside the vertical injection chamber; said vertical injection chamber has a plurality of open passages at both ends in alignment and axial communication with respective air outlets in the front partition of the delivery box determining the transport of the seeds towards proper dosing to the seed drill.

6. The agricultural implement assembly according to claim 1, wherein the detachable holding means from the aforementioned injection chambers are defined by a pair of opposed and aligned blind slots arranged openings located on the top back of said vertical sides extension of the delivery box, settling in the slots of each side a body of which two separate cantilevered wings are joined and parallel to each other and arranged to one projected on the other;

in each of the aforementioned wings are made two blind bottom elongated notches facing each other on a same straight line, leaving between each bottom of each pair of axially aligned notches a wing portion of a width equivalent to the width of the slot, so that the notches of one of the wings corresponds vertically aligned with the notches of the other overlapping wing, determining said slots housing seats of the aforementioned central portions of each wing; the aforementioned body has a screw whose thread fillet couples in a complementary thread fillet in a passage of the body, seating the protruding end of the screw against the second front wall of vertical chamber by pressing the first wall of the injection chamber against the partition of the air box.

7. The agricultural implement assembly according to claim 1, wherein the fastening and holding means of the respective axis end of the cylindrical body that rotates on its axis are a pair of circular clamps, each pair of clamps being arranged in a vertical plane against the external face of each substantially parallel and vertical wall of the delivery box, the bottom half-clamp being solidary of said wall while the top clamp component pivots hinged with respect to the bottom clamp component, the ends being opposite to that of the aforementioned joint provided with reciprocal closures; in its closed clamp condition, the interior of each clamp portion has respectively a semi-cylindrical inner seat that defines corresponding circular bearing tracks, aligned and coaxial to the axis of the aforementioned cylinder, within which the respective stub is seated arranged at each end of the dragging cylinder.

8. The agricultural implement assembly according to claim 1, wherein the vertical chamber of the volumetric delivery device is completed with an independent plate attachable against the second vertical chamber wall, the same being retained against it by a bottom holding means defined by a series of tabs on each of which a recess is delimited, said tabs being horizontally projecting from a small plane extended between both wall portions at an extension of the sides of the delivery box, the corresponding projections being seated at each said recess practiced on the bottom edge of the aforementioned independent plate; while above, said independent plate is linked by a pivoting arm arranged at each top end of the plate in the other slots, of the pair of slots present at the top edges of the extension of the side of the delivery box, said independent plate being provided with outlets of the air currents matching axially with the air outlets practiced in the corresponding vertical chamber.

9. The agricultural implement assembly according to claim 8, wherein said independent plate has two notches coinciding with the displacement path of the adjustment screw of the vertical chamber, determining the free passage of the end of said screw, said top linkage arms being housed in the slots arranged upstream regarding the slots wherein the holding means of the vertical chamber are housed.

\* \* \* \* \*